US011310552B1

(12) United States Patent
Taylor

(10) Patent No.: US 11,310,552 B1
(45) Date of Patent: Apr. 19, 2022

(54) TELEVISION RECEIVER ASSEMBLY

(71) Applicant: Toby Taylor, Rochester, MN (US)

(72) Inventor: Toby Taylor, Rochester, MN (US)

( * ) Notice: Subject to any disclaimer, the term of this patent is extended or adjusted under 35 U.S.C. 154(b) by 0 days.

(21) Appl. No.: 17/115,398

(22) Filed: Dec. 8, 2020

(51) Int. Cl.
| *H04N 5/44* | (2011.01) |
| *H04N 21/422* | (2011.01) |
| *H04N 5/225* | (2006.01) |
| *H04R 1/02* | (2006.01) |

(52) U.S. Cl.
CPC ..... *H04N 21/42222* (2013.01); *H04N 5/2257* (2013.01); *H04N 5/44* (2013.01); *H04R 1/025* (2013.01); *H04R 2499/15* (2013.01)

(58) Field of Classification Search
CPC ...... H04N 5/64; H04N 5/44; H04N 21/42222; H04N 5/2257; H04N 5/66; H04N 9/12; H04R 1/025; H04R 2499/15
USPC ................ 348/734, 794, 839, 791, 739, 725
See application file for complete search history.

(56) References Cited

U.S. PATENT DOCUMENTS

| 5,124,805 A | 6/1992 | Chung | |
| 5,945,918 A | 8/1999 | McGonigal | |
| 6,407,779 B1 | 6/2002 | Herz | |
| 6,749,507 B2 * | 6/2004 | Kutaragi | ................. A63F 13/08 463/31 |
| 7,750,590 B2 * | 7/2010 | Takaji | .................... F16M 11/08 318/470 |
| 8,250,142 B2 | 8/2012 | AbiEzzi | |
| 9,001,112 B2 * | 4/2015 | Choi | .................... H05K 5/0017 345/214 |
| 9,055,323 B2 | 6/2015 | Hill | |
| 2010/0053464 A1 * | 3/2010 | Otsuka | ................... G08C 17/02 348/734 |
| 2010/0073455 A1 | 3/2010 | Iwabuchi | |

* cited by examiner

*Primary Examiner* — Trang U Tran

(57) ABSTRACT

A television receiver assembly includes a disk that is positionable on a horizontal support surface such that the disk is visible to a user. A display is coupled to the disk and the display displays indicia comprising still imagery and video imagery. A camera is integrated into the disk to capture footage of an area proximate the disk. A pair of speakers is each of the speakers is coupled to the disk and each of the speakers is positioned on opposite sides of the display from each other. A locate button is incorporated into the disk and a remote control is in wireless communication with the display and the speakers. The remote control emits an audible alert when the locate button on the disk is depressed to facilitate the user to locate the remote control.

6 Claims, 4 Drawing Sheets

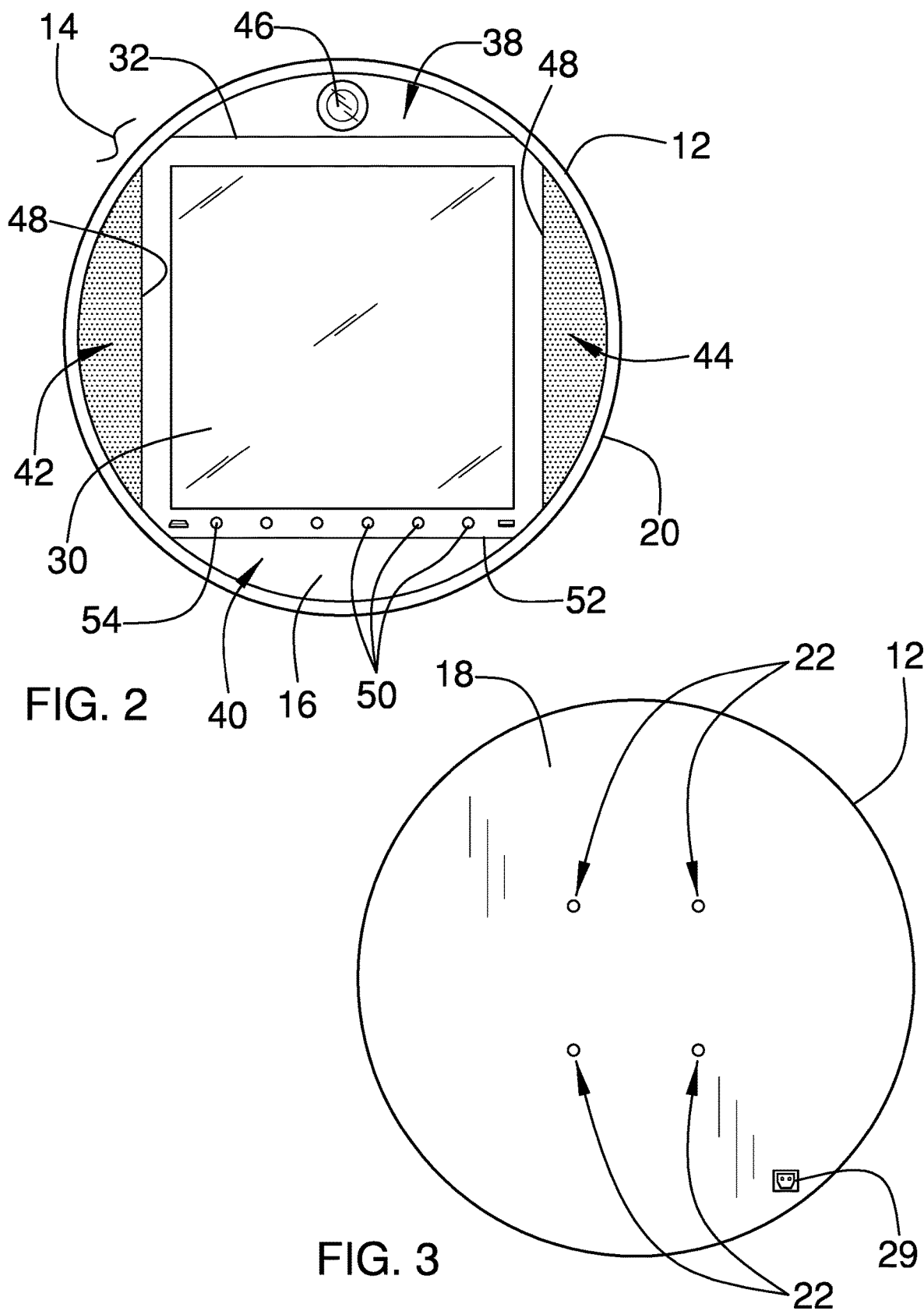

TELEVISION RECEIVER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to receiver devices and more particularly pertains to a new receiver device for viewing multimedia video and audio. Additionally, the receiver device includes a remote control that emits an audible alert when a locate button on the receiver is depressed. In this way a user can locate the remote control when the remote control is misplaced.

(2) Description of Related Art Including Information Disclosed Under 37 CFR 1.97 and 1.98

The prior art relates to receiver devices including a remote control that has an audible alert integrated therein for location the remote control when the remote control is misplaced. The prior art discloses a system for incorporating a television into a multimedia conference. The prior art discloses a touch screen display and a remote control that emits one of three different alerts when the remote control is misplaced.

BRIEF SUMMARY OF THE INVENTION

An embodiment of the disclosure meets the needs presented above by generally comprising a disk that is positionable on a horizontal support surface such that the disk is visible to a user. A display is coupled to the disk and the display displays indicia comprising still imagery and video imagery. A camera is integrated into the disk to capture footage of an area proximate the disk. A pair of speakers is each of the speakers is coupled to the disk and each of the speakers is positioned on opposite sides of the display from each other. A locate button is incorporated into the disk and a remote control is in wireless communication with the display and the speakers. The remote control emits an audible alert when the locate button on the disk is depressed to facilitate the user to locate the remote control.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front view of an embodiment of the disclosure.

FIG. 3 is a back view of an embodiment of the disclosure.

DETAILED DESCRIPTION OF THE INVENTION

Figure 1:
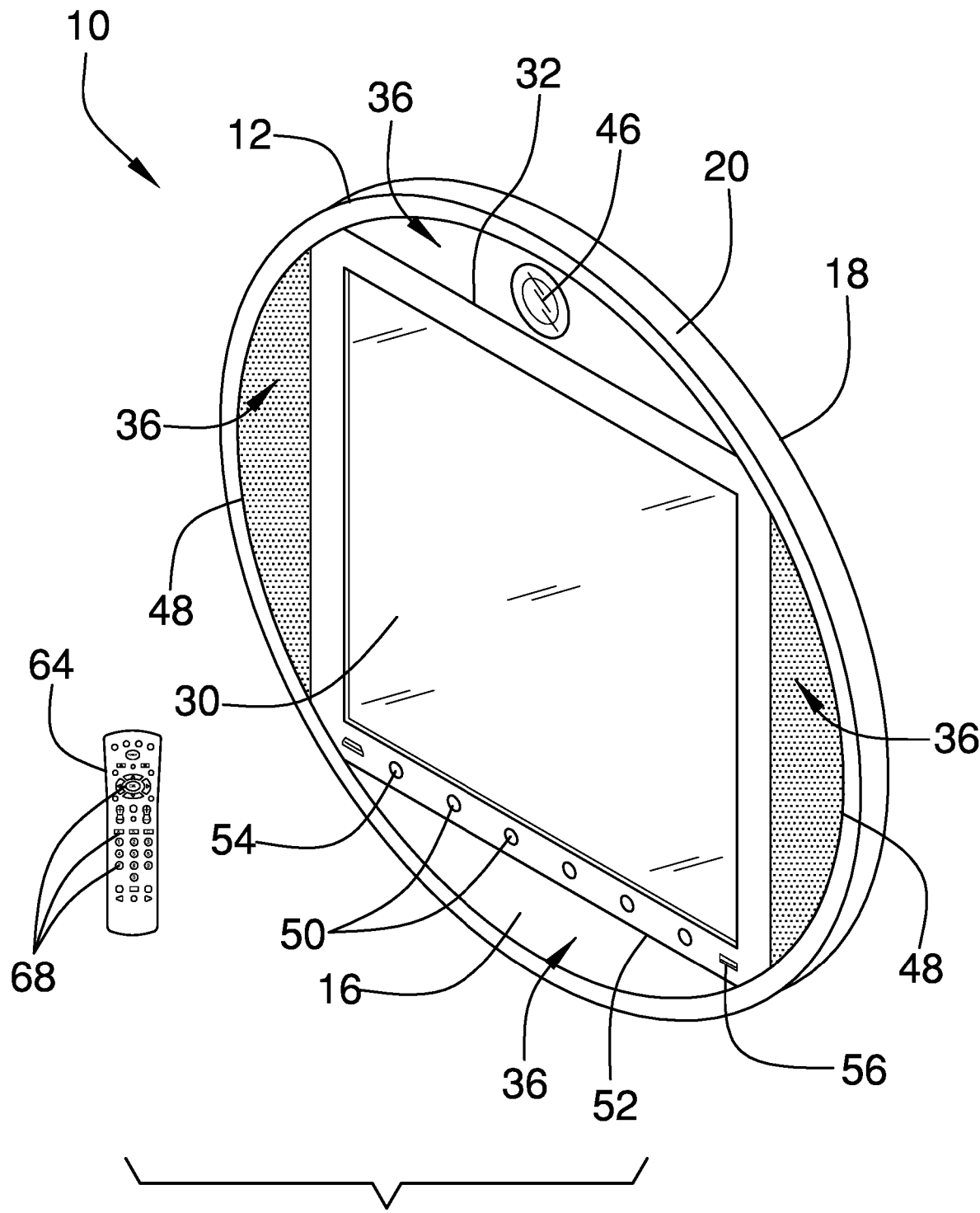
FIG. 1 is a front perspective view of a television receiver assembly according to an embodiment of the disclosure.

With reference now to the drawings, and in particular to FIGS. 1 through 5 thereof, a new receiver device embodying the principles and concepts of an embodiment of the disclosure and generally designated by the reference numeral 10 will be described.

As best illustrated in FIGS. 1 through 5, the television receiver assembly 10 generally comprises a disk 12 that is positionable on a horizontal support surface 14, such as a wall in a room or the like, such that the disk 12 is visible to a user. The disk 12 has a diameter of at least 36.0 inches, and the disk 12 has a front side 16, a back side 18 and a perimeter side 20 extending therebetween. The back side 18 has a plurality of fastener wells 22 each extending toward the front side 16. Moreover, the fastener wells 22 are strategically positioned to accommodate fasteners in the horizontal support surface 14.

A control circuit 24 is integrated into the disk 12 and a transceiver 26 is integrated into the disk 12. The transceiver 26 is electrically coupled to the control circuit 24 and the transceiver 26 is in wireless communication with a signal source 28. In this way the transceiver 26 can receive video data and audio data from the signal source 28. The transceiver 26 may comprise a radio frequency transceiver or the like which is capable of receiving a cable television signal and other standardized types of multimedia signals.

A display 30 is coupled to the disk 12 such that the display 30 is visible to the user. The display 30 is centrally positioned on the disk 12 and the display 30 is positioned on the front side 16 of the disk 12. The display 30 has a perimeter edge 32 and each of four corners 34 of the perimeter edge 32 intersects the perimeter side 20 of the disk 12. In this way a plurality of segments 36 of a circle is defined on the front side 16 of the disk 12. The plurality of segments 36 is distributed around the display 30, and the plurality of segments 36 includes an upper segment 38, a lower segment 40, a first lateral segment 42 and a second lateral segment 44. The display 30 is electrically coupled to the control circuit 24 and the display 30 displays indicia comprising still imagery and video imagery derived from the video data received by the transceiver 26. The display 30 may be an LED, an OLED or any other type of high definition display commonly associated with televisions.

A camera 46 is integrated into the disk 12 capture footage of an area proximate the disk 12. The camera 46 is positioned on the front side 16 of the disk 12, the camera 46 is positioned on the upper segment 38 of the front side 16 of the disk 12, and the camera 46 is centrally positioned in the upper segment 38. The camera 46 is electrically coupled to the control circuit 24 thereby facilitating the transceiver 26 to broadcast the footage capture by the camera 46. Additionally, the camera 46 may comprise a digital video camera thereby facilitating the user to participate in video conferencing and other forms of digital video communication.

A pair of speakers 48 is each coupled to the disk 12 to emit audible sound outwardly therefrom. Each of the speakers 48 is positioned on opposite sides of the display 30 from each other, and each of the speakers 48 is positioned in a respective one of the first lateral segment 42 and the second lateral segment 44 of the front side 16 of the disk 12. Each of the speakers 48 is shaped to conform to the respective first lateral segment 42 and the second lateral segment 44. Additionally, each of the speakers 48 is electrically coupled to the control circuit 24 such that each of the speakers 48 receives the audio data from the transceiver 26. In this way the pair of speakers 48 can emit audio which corresponds to the video displayed on the display 30.

A plurality of control buttons 50 is each incorporated into the disk 12 and each of the control buttons 50 can be manipulated by a user. Each of the control buttons 50 is positioned on an exposed side of the display 30 and the control buttons 50 are spaced apart from each other and are distributed laterally along a lower side 52 of the perimeter edge 32 of the display 30. Each of the control buttons 50 is electrically coupled to the control circuit 24 and the control buttons 50 control operational parameters of the display 30 and the speakers 48. The operational parameters include channel up, channel down, volume up, volume down, power and other parameters common to televisions. A locate button 54 is incorporated into the disk 12 and the locate button 54 can be manipulated by a user. The locate button 54 is electrically coupled to the control circuit 24 and the transceiver 26 broadcasts a locate signal when the locate button 54 is depressed.

A first data port 56 is integrated into the disk 12 to receive a first type of data cable 58. The first data port 56 is positioned on the front side 16 of the disk 12 and the first data port 56 is electrically coupled to the control circuit 24 to receive data from the first type of data cable 58. The first data port 56 may be a usb port and the first type of data cable 58 may be a usb cable. A second data port 60 is integrated into the disk 12 to receive a second type of data cable 62. The second data port 60 is structurally unique from the first data port 56 and the second data port 60 is electrically coupled to the control circuit 24 to receive data from the second type of data cable 62. The second data port 60 may comprise an HDMI port and the second type of data cable 62 may comprise an HDMI cable.

A remote control 64 is provided that is in wireless communication with the display 30 and the speakers 48 for remotely controlling operational parameters of the display 30 and the speakers 48. The remote control 64 emits an audible sound when the locate button 54 on the disk 12 is depressed. In this way the remote control 64 facilitates the user to locate the remote control 64 when the user misplaces the remote control 64. The remote control 64 includes an audible alert 66 that is integrated therein and a plurality of remote control buttons 68. The remote control 64 is in wireless communication with the transceiver 26 and the remote control 64 receives the locate signal. Moreover, the audible alert 66 is turned on when the remote control 64 receives the locate signal and the audible alert 66 is turned off whenever any of the remote control buttons 68 is depressed.

Figure 4:
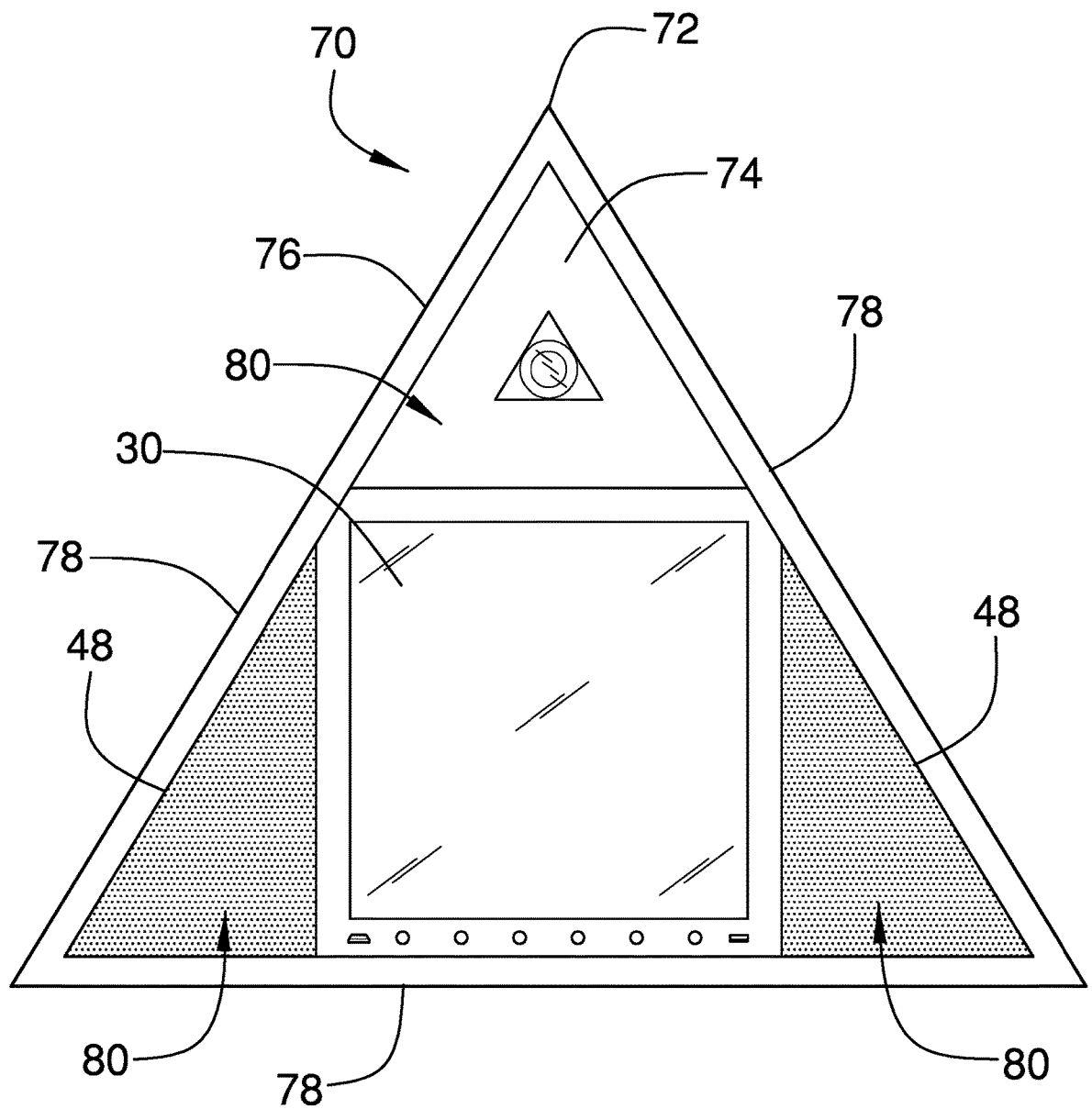
FIG. 4 is a front view of an alternative embodiment of the disclosure.
Figure 5:
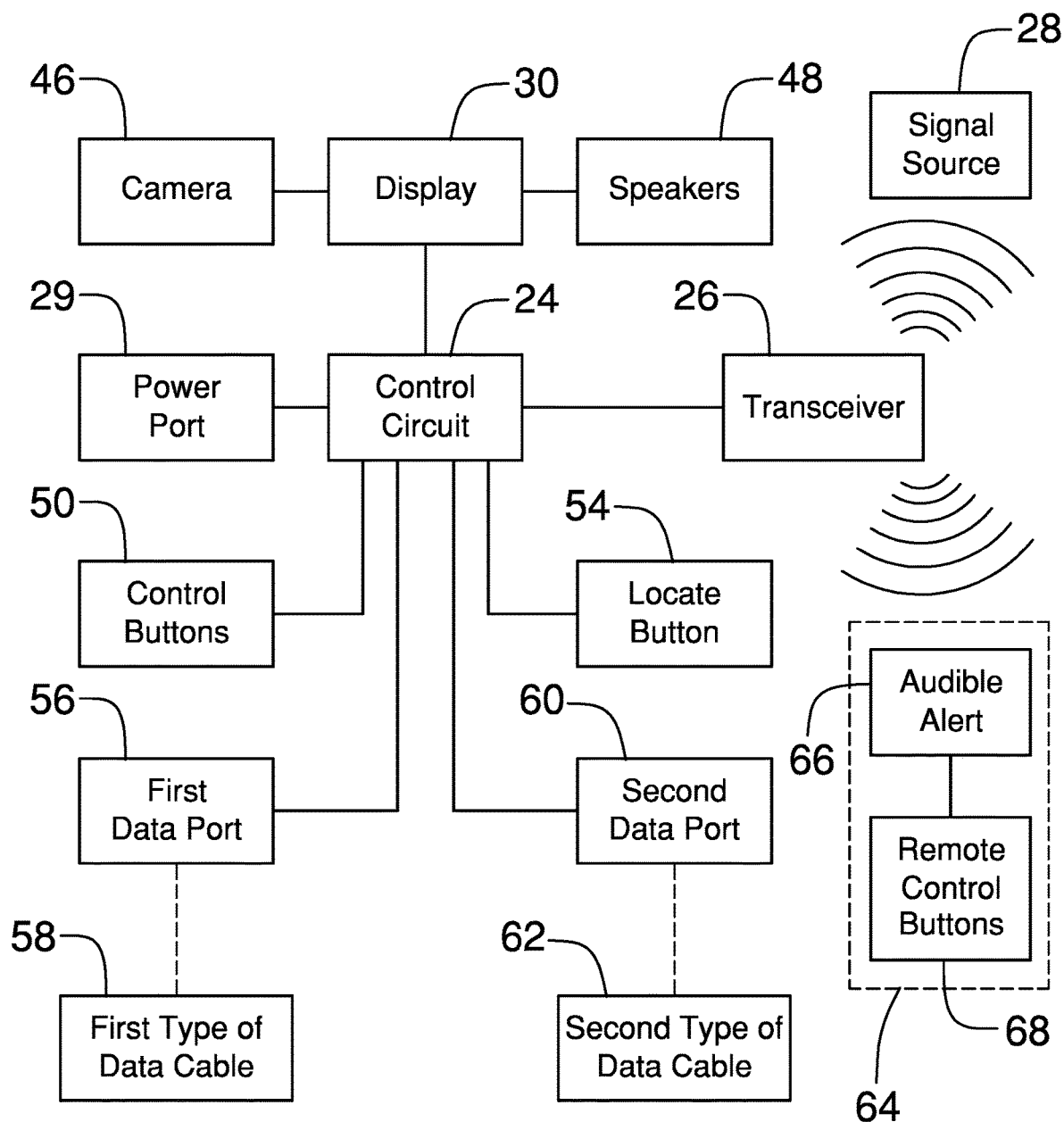
FIG. 5 is a schematic view of an embodiment of the disclosure.

In an alternative embodiment 70 as is most clearly shown in FIG. 4, a panel 72 is provided that has a forward side 74 and a perimeter side 76. The perimeter side 76 of the panel 72 has three intersecting sides 78 such that the panel 72 has a triangular shape. The display 30 is positioned on the forward side 74 having each of the four corners 34 of the perimeter edge 32 of the display 30 intersecting a respective one of the intersecting sides 78 of the perimeter side 76 of the panel 72. In this way the perimeter edge 32 of the display 30 forms a plurality of triangles 80 on the forward side 74. Additionally, each of the camera 46 and each of the speakers 48 is positioned in a respective one of the triangles 80 on the forward side 74.

In use, the display 30 is employed for watching broadcast television programming or a digital signal sent through either the first data port 56 or the second data port 60. The locate button 54 is depressed whenever the user misplaces the remote control 64. Thus, the audible alert 66 in the remote control 64 is turned on to facilitate the user to locate the remote control 64. Additionally, the audible alert 66 continuously emits the audible alarm until any of the remote control buttons 68 is depressed. In this way the user can easily locate the remote control 64 whenever the remote control 64 is misplaced.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A television receiver assembly for viewing video imagery and which has a remote control tracker, said assembly comprising:

a panel having a forward side and a perimeter side, said perimeter side of said panel having three intersecting sides such that said panel has a triangular shape;

a display, said display displaying indicia comprising still imagery and video imagery, said display being positioned on said forward side having each of said four corners of said perimeter edge of said display intersecting a respective one of said intersecting sides of said perimeter side of said panel, said perimeter edge of said display forming a plurality of triangles on said forward side;

a camera being integrated into said panel wherein said camera is configured to capture footage of an area proximate said panel;

a pair of speakers, each of said speakers being coupled to said panel wherein each of said speakers is configured to emit audible sound outwardly therefrom, each of said speakers being positioned on opposite sides of said display from each other, each of said camera and each of said speakers being positioned in a respective one of said triangles on said forward side;

a plurality of control buttons, each of said control buttons being incorporated into said panel wherein each of said control buttons is configured to be manipulated by a user;

a locate button being incorporated into said panel wherein said locate button is configured to be manipulated by a user;

a remote control being in wireless communication with said display and said speakers for remotely controlling operational parameters of said display and said speakers, said remote control emitting an audible alert when said locate button on said panel is depressed wherein said remote control is configured to facilitate the user to locate said remote control.

2. The assembly according to claim 1, further comprising:
a control circuit being integrated into said panel; and
a transceiver being integrated into said panel, said transceiver being electrically coupled to said control circuit, said transceiver being in wireless communication with a signal source wherein said transceiver is configured to receive video data and audio data from the signal source.

3. The assembly according to claim 1, wherein:
said assembly includes a control circuit being integrated into said panel;
said assembly includes a transceiver being integrated into said panel, said transceiver being electrically coupled to said control circuit, said transceiver being in wireless communication with a signal source wherein said transceiver is configured to receive video data and audio data from the signal source; and
said display is positioned on said front side of said panel, said display having a perimeter edge, said display being electrically coupled to said control circuit, said display displaying indicia comprising still imagery and video imagery derived from the video data received by said transceiver.

4. The assembly according to claim 3, wherein each of said control buttons is positioned on an exposed side of said display, said control buttons being spaced apart from each other and being distributed laterally along a lower side of said perimeter edge of said display, each of said control buttons being electrically coupled to said control circuit, said control buttons controlling operational parameters of said display and said speakers, including channel up, channel down, volume up, volume down, power and other parameters common to televisions.

5. The assembly according to claim 2, wherein:
said locate button is electrically coupled to said control circuit, said transceiver broadcasting a locate signal when said locate button is depressed; and
said remote control includes an audible alert being integrated therein and a plurality of remote control buttons, said remote control being in wireless communication with said transceiver, said remote control receiving said locate signal, said audible alert being turned on when said remote control receives said locate signal, said audible alert being turned off whenever any of said remote control buttons is depressed.

6. A television receiver assembly for viewing video imagery and which has a remote control tracker, said assembly comprising: a panel having a front side, a back side and a perimeter side extending therebetween, said back side having a plurality of fastener wells each extending toward said front side, said fastener wells being strategically positioned to accommodate fasteners in the horizontal support surface;

a control circuit being integrated into said panel;

a transceiver being integrated into said panel, said transceiver being electrically coupled to said control circuit, said transceiver being in wireless communication with a signal source wherein said transceiver is configured to receive video data and audio data from the signal source;

a display being coupled to said panel wherein said display is configured to be visible to the user, said display being centrally positioned on said panel, said display being positioned on said front side of said panel, said display having a perimeter edge, each of four corners of said perimeter edge intersecting said perimeter side of said panel to define a plurality of segments of a circle on said front side of said panel, said plurality of segments being distributed around said display, said plurality of segments including an upper segment, a lower segment, a first lateral segment and a second lateral segment, said display being electrically coupled to said control circuit, said display displaying indicia comprising still imagery and video imagery derived from the video data received by said transceiver;

a camera being integrated into said panel wherein said camera is configured to capture footage of an area proximate said panel, said camera being positioned on said front side of said panel, said camera being positioned on said upper segment of said front side of said panel, said camera being centrally positioned in said upper segment, said camera being electrically coupled to said control circuit thereby facilitating said transceiver to broadcast the footage capture by said camera;

a pair of speakers, each of said speakers being coupled to said panel wherein each of said speakers is configured to emit audible sound outwardly therefrom, each of said speakers being positioned on opposite sides of said display from each other, each of said speakers being positioned in a respective one of said first lateral segment and said second lateral segment of said front side of said panel, each of said speakers being shaped to conform to said respective first lateral segment and said second lateral segment, each of said speakers being electrically coupled to said control circuit such that each of said speakers receives the audio data from said transceiver wherein said pair of speakers is configured to emit audio which corresponds to the video displayed on the display;

plurality of control buttons, each of said control buttons being incorporated into said panel, wherein each of said control buttons is configured to be manipulated by a user, each of said control buttons being positioned on an exposed side of said display, said control buttons being spaced apart from each other and being distributed laterally along a lower side of said perimeter edge of said display, each of said control buttons being electrically coupled to said control circuit, said control buttons controlling operational parameters of said display and said speakers, including channel up, channel down, volume up, volume down, power and other parameters common to televisions;

a locate button being incorporated into said panel wherein said locate button is configured to be manipulated by a user, said locate button being electrically coupled to said control circuit, said transceiver broadcasting a locate signal when said locate button is depressed;

a first data port being integrated into said panel wherein said first data port is configured to receive a first type of data cable, said first data port being positioned on said front side of said panel, said first data port being electrically coupled to said control circuit wherein said control circuit is configured to receive data from the first type of data cable;

a second data port being integrated into said panel wherein said second data port is configured to receive a second type of data cable, said second data port being structurally unique from said first data port, said second data port being electrically coupled to said control circuit wherein said control circuit is configured to receive data from the second type of data cable;

a remote control being in wireless communication with said display and said speakers for remotely controlling operational parameters of said display and said speakers, said remote control emitting an audible alert when said locate button on said panel is depressed wherein said remote control is configured to facilitate the user to locate said remote control, said remote control including an audible alert being integrated therein and a plurality of remote control buttons, said remote control being, in wireless communication with said transceiver, said remote control receiving said locate signal, said audible alert being turned on when said remote control receives said locate signal, said audible alert being turned off whenever any of said remote control buttons is depressed; and a panel having a forward side and a perimeter side, said perimeter side of said panel having three intersecting sides such that said panel has a triangular shape, said display being positioned on said forward side having each of said four corners of said perimeter edge of said display intersecting a respective one of said intersecting sides of said perimeter side of said panel, said perimeter edge of said display forming a plurality of triangles on said forward side, each of said camera and each of said speakers being positioned in a respective one of said triangles on said forward side.

\* \* \* \* \*